(12) United States Patent
DeCoursey et al.

(10) Patent No.: US 10,068,419 B2
(45) Date of Patent: *Sep. 4, 2018

(54) DIGITAL SPREAD SPECTRUM TECHNIQUE FOR ELECTROMAGNETIC EMISSION REDUCTION

(71) Applicant: IGT, Las Vegas, NV (US)

(72) Inventors: Calvin DeCoursey, Reno, NV (US); Gene E. Powell, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,641

(22) Filed: Dec. 20, 2017

(65) Prior Publication Data

US 2018/0114402 A1   Apr. 26, 2018

Related U.S. Application Data

(63) Continuation of application No. 15/406,091, filed on Jan. 13, 2017, now Pat. No. 9,858,753, which is a continuation of application No. 13/487,053, filed on Jun. 1, 2012, now Pat. No. 9,547,329.

(51) Int. Cl.
*G06F 17/00* (2006.01)
*G07F 17/32* (2006.01)
*G06F 1/08* (2006.01)

(52) U.S. Cl.
CPC ............ *G07F 17/3227* (2013.01); *G06F 1/08* (2013.01)

(58) Field of Classification Search
None
See application file for complete search history.

(56) References Cited

U.S. PATENT DOCUMENTS

| | | | |
|---|---|---|---|
| 4,449,576 | A | 5/1984 | Baum et al. |
| 5,399,996 | A | 3/1995 | Yates et al. |
| 5,414,256 | A | 5/1995 | Gurner et al. |
| 5,430,392 | A | 7/1995 | Matejic |
| 5,555,277 | A | 9/1996 | Lawrence et al. |

(Continued)

OTHER PUBLICATIONS

Extended European Search Report for European Application No. 13169619.7, dated Feb. 20, 2017 (10 pages).

*Primary Examiner* — Paul A D'Agostino
(74) *Attorney, Agent, or Firm* — Neal, Gerber & Eisenberg LLP

(57) ABSTRACT

Techniques for reducing electromagnetic (EM) emission in a wager-based gaming machine. A gaming machine includes one or more processors configured to generate a bus clock signal having a fundamental frequency and fundamental spectral components at harmonics of the fundamental frequency. The fundamental spectral components each have a fundamental amplitude. A signal processor is configured to generate a spread spectrum clock signal having a nominal frequency substantially equivalent to the fundamental frequency of the bus clock signal as well as nominal spectral components at harmonics of the nominal frequency. However, the nominal spectral components each have a nominal amplitude less than the fundamental amplitude of a fundamental spectral component at the same harmonic. A bus connects the signal processor with one or more elements and carries the spread spectrum clock signal to the one or more elements, thereby reducing EM emissions from the bus.

16 Claims, 7 Drawing Sheets

(56) References Cited

U.S. PATENT DOCUMENTS

| | | |
|---|---|---|
| 5,561,792 A | 10/1996 | Ganapathy |
| 5,740,018 A | 4/1998 | Rumbut, Jr. |
| 6,005,429 A | 12/1999 | Zhong et al. |
| 6,167,947 B1 | 1/2001 | Hokanson et al. |
| 6,234,240 B1 | 5/2001 | Cheon |
| 6,300,806 B1 | 10/2001 | Theus et al. |
| 6,307,538 B1 | 10/2001 | Bacon |
| 6,626,264 B1 | 9/2003 | Christen |
| 6,643,317 B1 | 11/2003 | Blumer |
| 6,647,052 B2 | 11/2003 | Hailey |
| 6,690,156 B1 | 2/2004 | Weiner et al. |
| 6,822,160 B2 | 11/2004 | Schimmang |
| 7,118,483 B2 | 10/2006 | Beadell et al. |
| 7,821,404 B2 | 10/2010 | Walker et al. |
| 7,883,421 B2 | 2/2011 | Moore et al. |
| 8,008,961 B2 | 8/2011 | Garg et al. |
| 8,750,324 B2 | 6/2014 | Hansquine et al. |
| 8,840,480 B2 | 9/2014 | Cornell et al. |
| 9,547,329 B2 * | 1/2017 | DeCoursey ............... G06F 1/08 |
| 9,858,753 B2 * | 1/2018 | DeCoursey ............... G06F 1/08 |
| 2002/0061777 A1 | 5/2002 | Tanaka |
| 2002/0122299 A1 | 9/2002 | Kelly et al. |
| 2003/0128768 A1 | 7/2003 | Harres |
| 2004/0142753 A1 | 7/2004 | Beadell et al. |
| 2004/0185938 A1 | 9/2004 | Moore et al. |
| 2005/0124417 A1 | 6/2005 | Sosnoski et al. |
| 2006/0031618 A1 | 2/2006 | Hansquine et al. |
| 2007/0164883 A1 | 7/2007 | Furtner |
| 2008/0026854 A1 | 1/2008 | Chen et al. |
| 2009/0005178 A1 | 1/2009 | Abe et al. |
| 2009/0104989 A1 | 4/2009 | Williams et al. |
| 2011/0182022 A1 | 7/2011 | Lu et al. |
| 2011/0277967 A1 | 11/2011 | Fried et al. |
| 2012/0282997 A1 | 11/2012 | Miner et al. |
| 2013/0324264 A1 * | 12/2013 | DeCoursey ............... G06F 1/08 463/43 |
| 2014/0015578 A1 | 1/2014 | Gebre-Selassie et al. |
| 2014/0139060 A1 | 5/2014 | Pilard |

* cited by examiner

DIGITAL SPREAD SPECTRUM TECHNIQUE FOR ELECTROMAGNETIC EMISSION REDUCTION

PRIORITY CLAIM

This patent application is a continuation of and claims priority to and the benefit of U.S. patent application Ser. No. 15/406,091, which was filed on Jan. 13, 2017, which is a continuation of and claims priority to and the benefit of U.S. patent application Ser. No. 13/487,053, which was filed on Jun. 1, 2012, now U.S. Pat. No. 9,547,329, the entire contents of which are incorporated herein by reference.

TECHNICAL FIELD

The present disclosure relates generally to wager-based gaming machines, and more specifically to methods and devices for reducing electromagnetic (EM) emission in a wager-based gaming machine.

BACKGROUND

Typically, utilizing a master gaming controller, a gaming machine controls various combinations of devices that allow a player to play a wager game on the gaming machine and also encourage game play on the gaming machine. For example, a wager game played on a gaming machine usually requires a player to input money or indicia of credit into the gaming machine, indicate a wager amount, and initiate a game play. These steps require the gaming machine to control payment devices, including bill validators and coin acceptors, to accept money into the gaming machine and recognize user inputs from user interfaces, including key pads, button pads or touch screens, to determine the wager amount and initiate game play. After game play has been initiated, the gaming machine determines a wager game outcome, presents the game outcome to the player and may dispense an award of some type depending on the outcome of the wager game.

Modern gaming machines make liberal use of lights to enhance the visual experience of the player as well as to convey information regarding game events to the player. Groups of lights in a common location within the game machine are often connected to a common circuit board, or lighting board, which controls the operation of the lights. The lighting board selectively operates each light based on instructions received from the master gaming controller over a communications, or light bus. The light bus connecting the master gaming controller to the lighting board carries a clock signal to synchronize data sent along the bus. The light bus may be several feet long and a major source of EM emissions from the game machine.

The EM emissions from the light bus have a pronounced energy peak at a fundamental frequency equal to the frequency of the clock signal, and also at harmonics of the fundamental frequency. Radiation at these frequencies can interfere with other carrier signals and devices. Such interference is known as electromagnetic interference (EMI).

The Federal Communication Commission (FCC) rules limit EM emission levels for gaming machines over a range of frequencies. In gaming machines, when emission is excessive at one or more frequencies, remedies that may be effective in lowering emissions include adding shielding components, adding ferrite clamps to harnesses (both inter-assembly signal harnesses and power/ground harnesses), improving grounding connections between system components, and board redesigning to add key signal filtering, improve on-board power/ground handing, or incorporate various signal integrity improvement techniques at the board level. These solutions often increase system cost because of added material, manufacturing, and labor costs. Furthermore, sometimes these remedies are not reliably replaced after system field maintenance because leaving them out has no detrimental effect on the functional operation of the gaming machine.

For the foregoing and other reasons, it would be desirable to provide novel methods and devices for reducing EM emission levels at low cost in gaming machines that are not subject to inadvertent removal or disablement.

SUMMARY

Various embodiments described or referenced herein are directed to gaming machines and methods implementing and using techniques for reducing EM emissions in gaming machines.

In some implementations, a gaming machine includes one or more elements, one or more microprocessors, a signal processor, and a bus. The one or one or more elements are controlled by a spread spectrum clock signal. The one or more microprocessors are configured to generate a bus clock signal. The bus clock signal has a fundamental frequency and fundamental spectral components at harmonics of the fundamental frequency. The fundamental spectral components each have a fundamental amplitude.

The signal processor is configured to generate the spread spectrum clock signal. The spread spectrum clock signal has a nominal frequency substantially equivalent to the fundamental frequency of the bus clock signal and nominal spectral components at harmonics of the nominal frequency. The nominal spectral components each have a nominal amplitude less than the fundamental amplitude of a fundamental spectral component at the same harmonic. The bus communicatively connects the signal processor with the one or more elements and carries the spread spectrum clock signal to the one or more elements.

In some implementations, the gaming machine further includes a master clock generator configured to generate a master clock signal. The one or more microprocessors are further configured to generate the bus clock signal by dividing the master clock signal.

In some implementations, the signal processor is configured to generate the spread spectrum clock signal utilizing the bus signal and the master clock signal.

In some implementations, the signal processor is configured to generate the spread spectrum clock signal by causing the bus signal to jitter between two or more frequencies around the fundamental frequency while maintaining the nominal frequency.

In some implementations, the amount of jitter between the two or more frequencies around the fundamental frequency is based on the frequency of the master clock signal.

In some implementations, the one or more microprocessors are further configured to provide wager game play on the gaming machine.

In some implementations, the one or more microprocessors are further configured to generate a data signal for controlling the one or more elements. The one or more elements are further configured to receive the data signal. The bus is further configured to carry the data signal to the one or more elements. In some implementations, the signal processor is further configured to synchronize the data signal with the spread spectrum clock signal.

In some implementations, the signal processor is implemented with a programmable logic device such as a field programmable gate array (FPGA) or complex programmable logic device (CPLD). The programmable logic device is further configured to perform address decoding, signal direction control, or various logic functions in the gaming machine unrelated to lowering EM emissions.

In some implementations, the one or more elements include a lighting board. The gaming machine further includes a lighting display. The lighting board may include light emitting elements configured to provide lighting to the lighting display.

In some implementations, a method provides for lowering EM emissions in a gaming machine. The method includes: generating a bus clock signal having a fundamental frequency, wherein the bus clock signal has fundamental spectral components at harmonics of the fundamental frequency, the fundamental spectral components each having a fundamental amplitude; generating a spread spectrum clock signal having a nominal frequency substantially equivalent to the fundamental frequency of the bus clock signal, wherein the spread spectrum clock signal has nominal spectral components at harmonics of the nominal frequency, the nominal spectral components each having a nominal amplitude less than the fundamental amplitude of a fundamental spectral component at the same harmonic; and sending the spread spectrum clock signal to one or more elements controlled by the spread spectrum clock signal via a bus.

In some implementations, generating the bus clock signal includes generating and dividing a master clock signal.

In some implementations, generating the spread spectrum clock signal includes utilizing the bus clock signal and the master clock signal.

In some implementations, generating the spread spectrum clock signal includes causing the bus signal to jitter between two or more frequencies around the fundamental frequency while maintaining the nominal frequency.

In some implementations, the amount of jitter between the two or more frequencies is based on the frequency of the master clock signal.

In some implementations, the method includes providing wager game play on the gaming machine.

In some implementations, the method further includes generating a data signal for controlling the one or more elements. The one or more elements are further configured to receive the data signal. The method further includes sending the data signal to the one or more elements via the bus. In some implementations, the method further includes synchronizing the data signal with the spread spectrum clock signal with a programmable logic device and sending a synchronized data signal to the one or more elements via the bus.

In some implementations, a programmable logic device such as an FPGA or CPLD generates the spread spectrum clock signal and performs address decoding, signal direction control, or other logic functions in the gaming machine unrelated to lowering EM emissions.

In some implementations, one or more of the elements include a lighting board. In some implementations, the lighting board includes light emitting elements, the light emitting elements configured to provide lighting to a lighting display.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed subject matter. These drawings in no way limit any changes in form and detail that may be made to embodiments by one skilled in the art without departing from the spirit and scope of the disclosure.

DETAILED DESCRIPTION

Applications of gaming machines and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the invention as defined by the appended claims.

The present subject matter provides gaming machines and methods implementing and using techniques for reducing EM emissions in gaming machines. Although the current description primarily describes gaming machines, some implementations of the invention apply equally to other types of digital devices.

Figure 1:
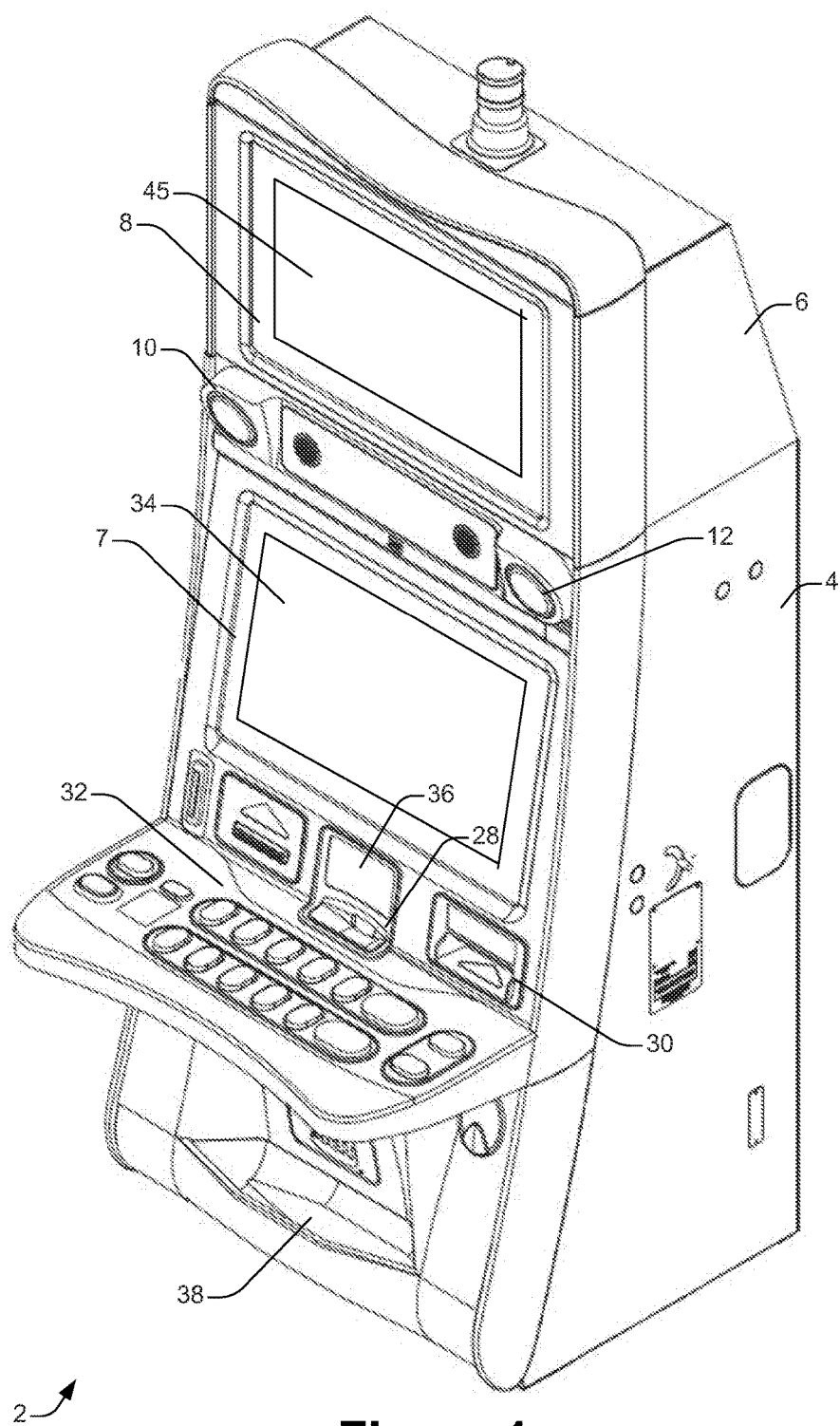
FIG. 1 shows an example of an exterior of a gaming machine 2, configured in accordance with some implementations.
Figure 2:
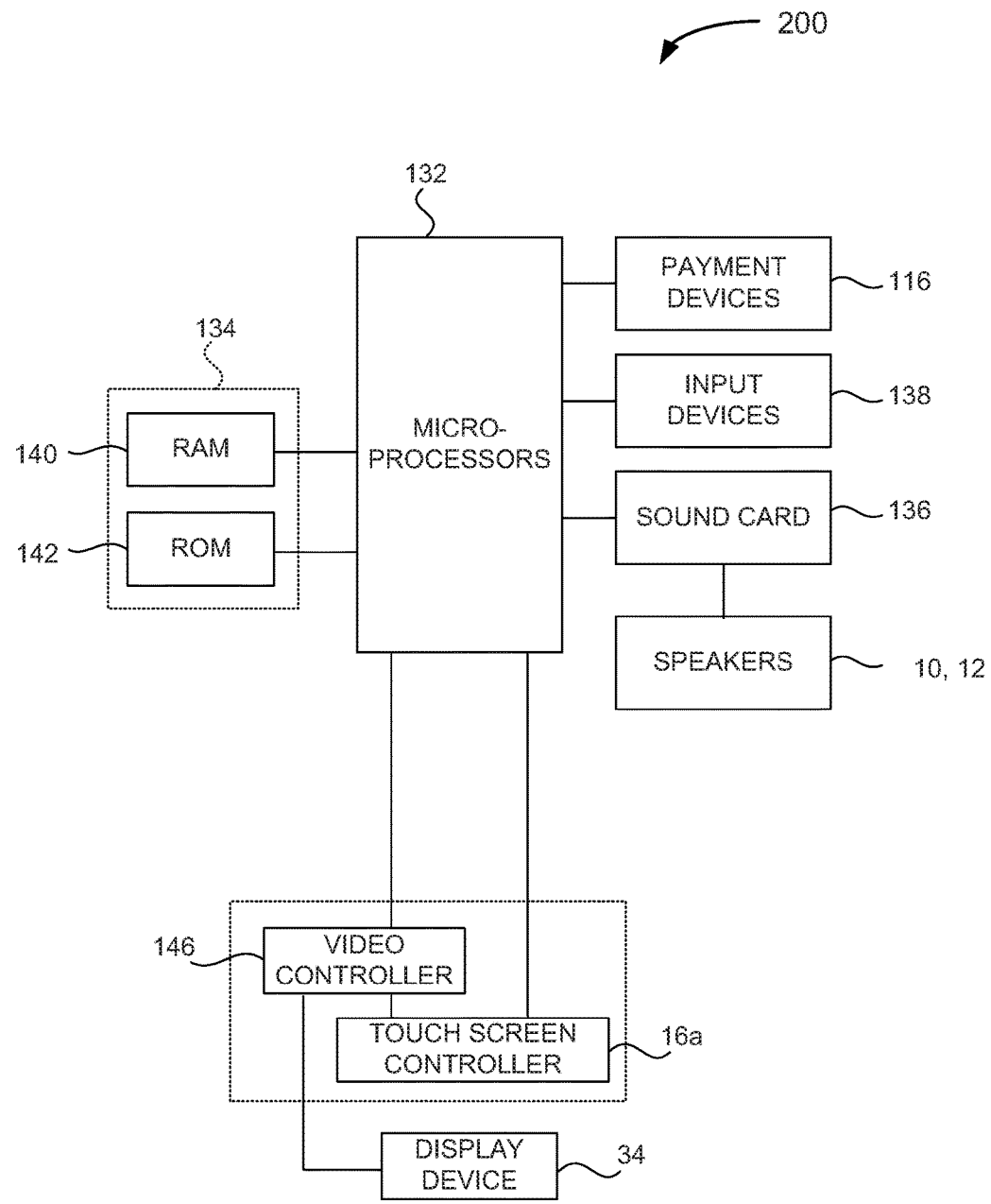
FIG. 2 shows an example of a gaming machine system 200, configured in accordance with some implementations.

With reference to FIGS. 1 and 2, a gaming machine 2 may include an external cabinet 4 that houses one or more microprocessors 132 that communicate with a memory device 134. The one or more microprocessors and the memory device may comprise a master gaming controller that controls the operation of components in the gaming machine 2 to present one or more games, receive player inputs from various input devices, and control other gaming machine functionalities.

The one or more microprocessors 132 may include general purpose or specialized processors. The one or more microprocessors may be a logic system including a plurality of specialized logic devices configured to control various devices and functionalities. For instance, a first logic device may control input devices while a second logic device may control the generation of graphics for display.

The memory device 134 may include one or more memory modules, flash memory or another type of memory that stores executable programs that are used by the one or more microprocessors. The memory device 134 can include any suitable software and/or hardware structure for storing data, including a tape, CD-ROM, floppy disk, hard disk or any other optical or magnetic storage media. The memory device 134 may also include a) random access memory (RAM) 140 for storing event data or other data generated or used during a particular game and b) read only memory (ROM) 142 for storing program code that controls functions on the gaming machine such as playing a game.

Although the one or more microprocessors 132 and the memory device 134 may reside in the gaming machine as shown in FIGS. 1 and 2, some configurations provide some or all of their functions at a central location or remote location. For example, some of the described functionality may be provided by a network server over a local area network (LAN), wide area network (WAN), Internet connection, microwave link, and the like.

The gaming machine 2 further may further include various devices that may be under the control of the one or more microprocessors 132. In some implementations, the gaming machine may include one or more input devices 138. Such devices allow a player to interact with the gaming machine. Examples of input devices may include a pull arm or input switches 32 (e.g., a play button, a bet button or a cash out button). One or more of these input device functions could also be implemented on a touch screen, such as a touch screen 33 which may be coupled with a display device screen to receive inputs from the player.

In some implementations, the input devices may include a game activation device that may be used by the player to start any primary game or sequence of events in the gaming machine. The game activation device can be any suitable play activator such as a "bet one" button, a "max bet" button, or a "repeat the bet" button located on the input switches 32 or the touch screen. The gaming machine may automatically activate game play after detecting user input via the game activation device. Other input devices may include a key pad for entering player tracking information, a card reader for entering a magnetic striped card containing player tracking information, a cash-out button for receiving a cash payment or other suitable form of payment corresponding to the number of remaining credits.

In some implementations, the gaming machine may include payment devices 116. The payment devices include devices for receiving and rewarding payment in various forms. Examples of payment devices include a coin acceptor 28, a bill validator 30, and a coin dispensing tray 38. In some examples, a ticketing system may be used to accept and print tickets for a cashless ticketing system.

In some implementations, the gaming machine may include communication ports for enabling communication of the gaming machine processor with external peripherals, such as external video sources, expansion buses, game or other displays, a SATA port, a key pad, or a network interface for communicating via a network.

In some implementations, the gaming machine may include a sound generating device coupled to one or more sound cards 136. The sound generating device may include one or more speakers 10 and 12 or other sound generating hardware and/or software. The speakers may be mounted and situated in the cabinet with an angled orientation toward the player.

In some implementations, the gaming machine may include one or more display devices. For example, the gaming machine 2 includes the display device 34 and an information panel 36. The display device 34 and the information panel 36 may each include any of a cathode ray tube, an LCD, a light emitting diode (LED) based display, an organic light emitting diode (OLED) based display, a polymer light emitting diode (PLED) based display, an SED based-display, an E-ink display, a plasma display, a television display, a display including a projected and/or reflected image, or any other suitable electronic display device.

In some implementations, the display devices at the gaming machine may include one or more electromechanical devices such as one or more rotatable wheels, reels, or dice. The display device may include an electromechanical device adjacent to a video display, such as a video display positioned in front of a mechanical reel. The display devices may include dual-layered or multilayered electromechanical and/or video displays that cooperate to generate one or more images. The display devices may include a mobile display device, such as a smart phone or tablet computer, configured to play of at least a portion of the primary or secondary game at a location remote from the gaming machine. The display devices may be of any suitable size and configuration, such as a square, a rectangle or an elongated rectangle.

In some implementations, the display devices of the gaming machine are configured to display game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the gaming machine may include a top box. For example, the gaming machine includes a top box 6, which sits on top of the main cabinet 4. The top box 6 may house any of a number of devices, which may be used to add features to a game being played on the gaming machine 2. These devices may include the speakers 10 and 12, a display device 45, and any other devices. Furthermore, the top box 6 may house different or additional devices not illustrated in FIGS. 1 and 2. For example, the top box may include a bonus wheel or a back-lit silk screened panel which may be used to add bonus features to the game being played on the gaming machine. As another example, the top box may include a display for a progressive jackpot offered on the gaming machine. As yet another example, the top box may include a smart card interaction device. During a game, these devices may be controlled and powered, at least in part, by circuitry (e.g. the one or more microprocessors and the memory device) housed within the main cabinet 4 of the gaming machine 2.

In some implementations, the gaming machine includes one or more lighting displays. The lighting displays may be used to produce an attractive visual presentation or to indicate the occurrence of various game states such as a winning outcome or bonusing availability. In the gaming machine shown in FIG. 1, the display device 34 is bordered by a lighting display 7 and the set top box display device 45 is bordered by a lighting display 8. While FIG. 1 shows two lighting displays implemented as borders around the display devices, those of skill in the art will appreciate that various lighting displays may be placed anywhere on the exterior of the gaming machine and in any arrangement as a matter of design choice.

The lighting displays may include a plurality or chain of light emitting elements on one or more lighting boards. A lighting board may be a printed circuit board configured to receive a signal from the gaming machine to control the plurality of light emitting elements. In some implementations, the light emitting elements may be located behind a diffuser that scatters the emitted light. The lighting board and the diffuser may be located behind a light transmissive glass. The glass serves as a protective barrier for the light emitting elements while being back lit by the light emitting elements.

The light emitting elements on the lighting boards may be light emitting diodes (LEDs). The light emitting elements may be any other effective light sources known to those of skill in the art including incandescent, florescent, fiber optic, light pipes, organic light emitting diodes (OLEDs) or combinations thereof. The color of emitted light may be determined by the configuration of the lighting board (e.g., the type of light emitting element) or the data signal sent by the one or more microprocessors of the gaming machine.

Figure 3:
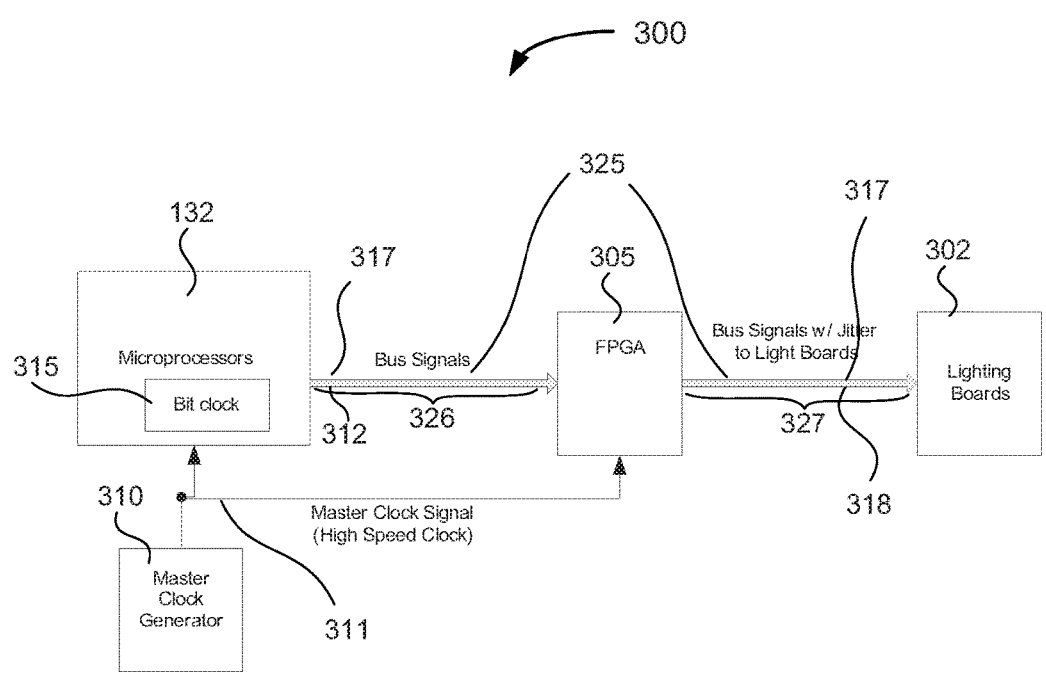
FIG. 3 shows an example of a control system 300 for lighting boards of a gaming machine, configured in accordance with some implementations.

FIG. 3 shows an example of a control system 300 for the lighting boards, configured in accordance with some implementations. A master clock generator 310 generates a master clock signal 311 that is used to synchronize the control of digital devices in the gaming machine.

In some implementations, the master clock signal is used as a source signal for generating other clock signals with slower frequencies. These other clock signals may be carried along with data signals to various devices via one or more buses for controlling the operation of the devices. As shown in FIG. 3, a bit clock 315 may divide the master clock signal into a bus clock signal 312 that controls the data rate of the bus. The bus data is typically significantly lower in frequency than the master clock (by ×8 or ×10 or more) and may be in the 1 MHz to 10 MHz range.

In other implementations, the bus clock signal 312 is generated directly by the bit clock. For instance, the bit clock 315 may generate the bus clock signal without receiving the master clock signal 311 as input and using the master clock signal.

Returning to FIG. 3, the one or more microprocessors 132 may be configured to generate a data signal 317. The data signal may be generated by the gaming machine as it executes code for providing a wager game, an attraction sequence, a bonus game, or the like. The data signal 317 includes data for controlling the operation of one or more lighting boards 302. For example, the data signal may indicate that certain light emitting elements switch on while other light emitting elements switch off. In a conventional gaming machine, the bus clock signal 312 oscillates at a fixed frequency between a high state and a low state to coordinate the timing of the switching.

In some implementations, electronic emissions caused by the bus clock signal 312 being carried on the bus 325 is reduced by a digital spread spectrum technique. The digital spread spectrum technique involves altering the bus clock signal so that the bus clock signal no longer operates at a single frequency. The bus clock signal 312 may be altered with a signal processor circuit. In one example, the signal processor circuit may be implemented with a programmable logic device 305, such as a field programmable gate array (FPGA) or a complex programmable logic device (CPLD). The programmable logic device 305 may be physically disposed proximately to the one or more microprocessors to reduce the amount of EM emissions in a length 326 of the bus 325.

The programmable logic device is an integrated circuit designed to be configurable for specific functionalities after manufacturing. The configuration or function of the programmable logic device is generally specified in code using a hardware description language and then loaded into the programmable logic device. In a conventional gaming machine, a programmable logic device such as an FPGA may be used for many other functions besides clock manipulations or EM reduction, such as address decoding, signal direction control and other logic functions unrelated to lowering EM emissions. Therefore, implementing the signal processor circuit with the programmable logic device may not require additional hardware being added to the gaming machine.

In some implementations, the programmable logic device is programmed to generate a spread spectrum clock signal 318. Further details regarding the generation of the spread spectrum clock signal are described below.

The spread spectrum clock signal 318 may be sent to the one or more lighting boards 302 via a length 327 of the bus 325. The spread spectrum clock signal oscillates between a high state and a low state to coordinate the timing of the switching for lighting elements on the one or more lighting boards. Unlike the bus clock signal 312, however, the spread spectrum clock signal has been altered so that its frequency is not a constant, but is varied among two or more frequencies so that the EM emission is not confined to a single frequency and its harmonics but is spread at reduced peak power among multiple frequencies and their harmonics.

It will be appreciated that the one or more lighting boards 302 is only one example of an element of the gaming machine that may utilize the spread spectrum clock signal 318. The gaming machine may be configured such that any other device or element may be configured to utilize the spread spectrum clock signal 318 received via the length 327 of the bus 325.

Figure 4:
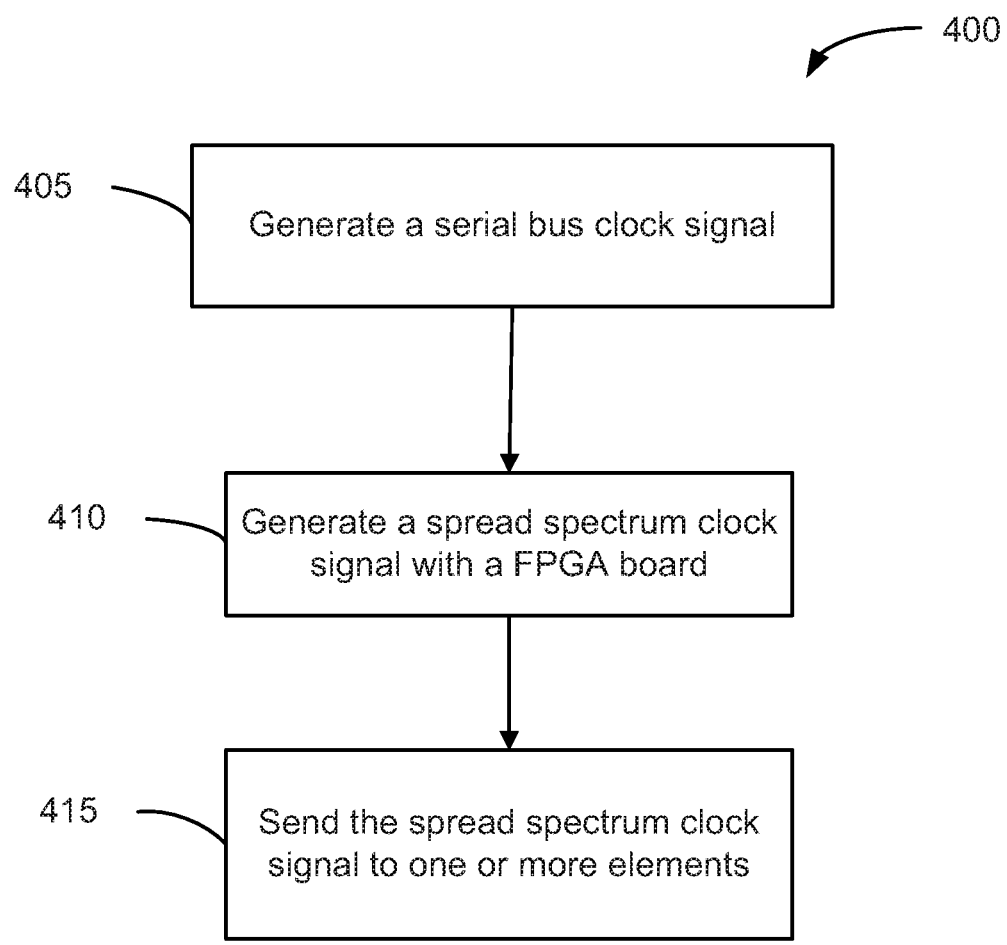
FIG. 4 shows a flowchart of an example of a method 400 for reducing EM emissions using a digital spread spectrum technique, performed in accordance with some implementations.

FIG. 4 shows a flowchart of an example of a method 400 for reducing EM emissions using a digital spread spectrum technique, performed in accordance with some implementations. For clarity, the method 400 is described with reference to the structures shown in FIG. 3. However, it will be appreciated that the structures shown in FIG. 3 are only example structures for implementing the method 400, and that other structures may be used.

In block 405, a bus clock signal is generated. In some implementations, the master clock generator 310 generates a master clock signal which is used by the one or more microprocessors 132 to generate the bus clock signal. The one or more microprocessors may include a clock divider circuit (not shown) which takes an input signal at a first frequency and generates an output signal at a second frequency:

$$f\text{ out} = \frac{f\text{ in}}{n}$$

where n is an integer whose value is determined by the clock divider circuit designed. In one example, the clock divider is configured such that n is 10. If the master clock signal is at 30 MHz, the bus clock signal would be at 3 MHz.

As would be understood by a person of skill in the art, the oscillation of the bus clock signal when carried via a lengthy bus, such as the bus 325 shown in FIG. 3, results in electronic emissions with fundamental EM spectral components at the fundamental frequency (e.g., 3 MHz) as well as at harmonics of the fundamental frequency. The amplitude of some of these spectral components may exceed FCC specifications.

In block 410, a spread spectrum clock signal is generated with a signal processor circuit, such as the programmable logic device 305. The spread spectrum clock signal 318 shares a nominal frequency substantially equivalent to the fundamental frequency of the bus clock signal (e.g., 3 MHz). The spread spectrum clock signal also has nominal EM spectral components at harmonics having substantially equivalent frequencies as the harmonics of the nominal frequency. Unlike the bus clock signal, however, the spread spectrum clock signal jitters between two or more frequencies around the fundamental frequency. This causes the EM emissions of the bus clock signal at the fundamental frequency and its higher frequency harmonics to be split into two or more frequency "buckets." As a result, the nominal EM spectral components each have a nominal amplitude less than the fundamental amplitude of a fundamental EM spectral component at the same harmonic.

Figure 5:
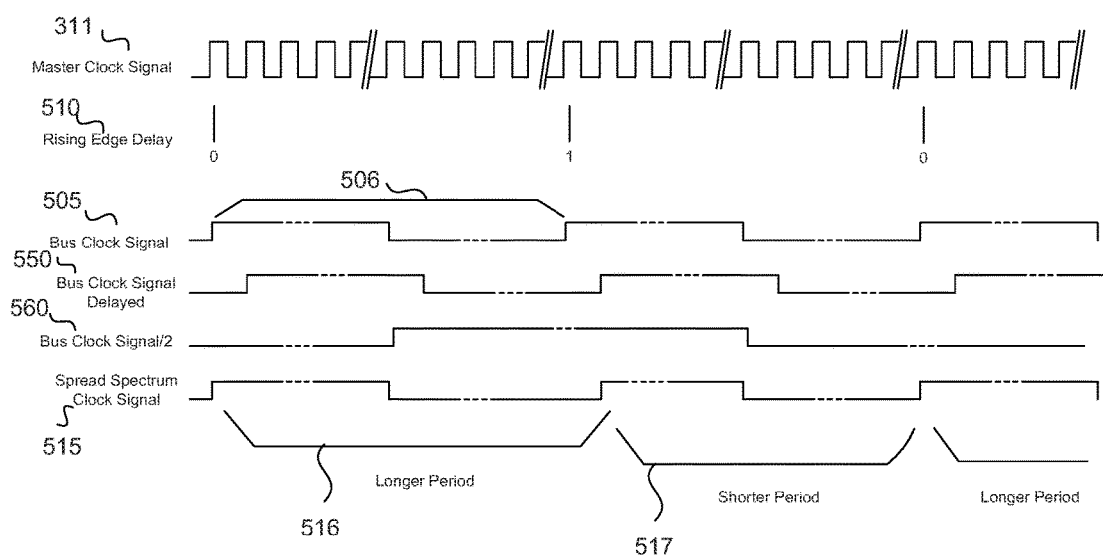
FIG. 5 shows an example digital spread spectrum technique, in accordance with some implementations.

One example of a digital spread spectrum technique where the EM emissions are split into two buckets is shown in FIG. 5. At 505, the bus clock signal is shown having a period 506. The master clock signal 311, as discussed above, has a period that is n times shorter than the bus clock signal. The spread spectrum signal 515 is generated by lengthening and shortening the bus clock signal by one master clock signal period. For instance, the longer period 516 and the shorter period 517 may be expressed as:

Longer period=bus clock signal period+master clock signal period

Shorter period=bus clock signal period−master clock signal period.

This may be achieved by delaying every other rising edge of the bus clock signal by one master clock signal period, as shown at 510, wherein a 1 means delaying the rising edge and a 0 means not delaying the rising edge. Those of skill in the art will appreciate a rising edge transition is used when devices utilizing the clock for synchronization are configured for rising edge transitions. If such devices were configured for falling edge transitions, similar results could be achieved by delaying every other falling edge.

Figure 7:
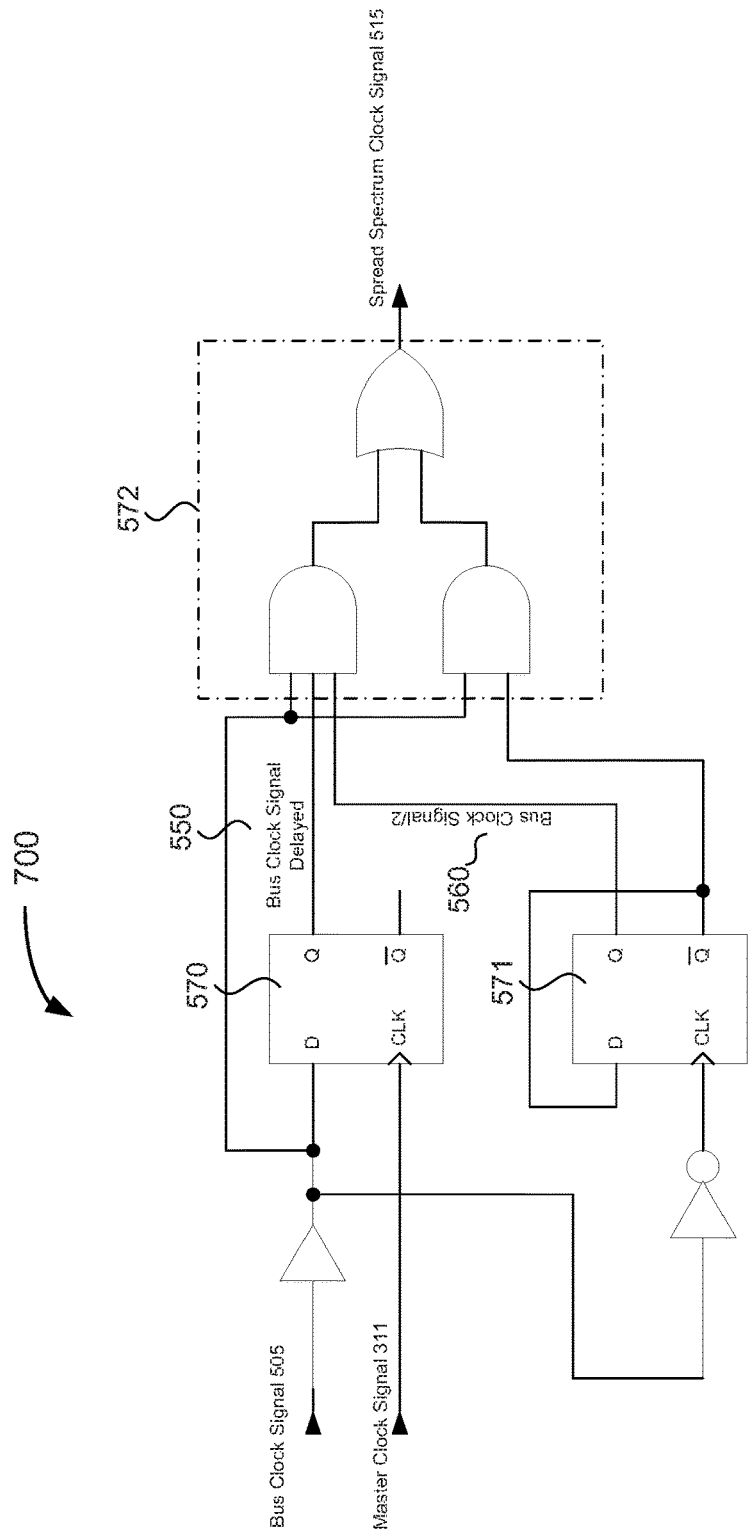
FIG. 7 shows an example circuit 700 for performing the example digital spread spectrum technique shown in FIG. 5, configured in accordance with some implementations.

FIG. 7 shows an example circuit 700 for performing the method 500, configured in accordance with some implementations. It will be appreciated that example circuit 700 is only an example and that other implementations may be used to achieve the described functionalities. In some implementations, the example circuit 700 is implemented using a programmable logic device and the circuit may be specified using a hardware design language such as VHSIC hardware description language (VHDL) or Verilog. In other implementations, the example circuit or a circuit with similar function may be implemented in specialized hardware rather than the programmable logic device.

As shown in FIG. 7, the circuit 700 is configured to receive the bus clock signal 505 and the master clock signal 311 and to output the spread spectrum clock signal 515. For this example circuit 700, an assumption may be made that the master clock signal 311 leads the bus clock signal 505 in order to avoid a race condition. This is a reasonable assumption when the master clock signal 311 is used to generate the bus clock signal 505. If this assumed timing relationship between the master clock signal 311 and the bus clock signal 505 is not the case or if the relationship is unknown, the circuit that generates the spread spectrum clock signal 515 would have to take this in account to avoid a race condition.

The bus clock signal delayed 550 is the bus clock signal delayed by one master clock period by a D flip flop 570 that clocks the bus clock signal 505 on positive transitions of the master clock signal 311.

The D flip flop 571 operates as a free-running divider that creates the bus clock signal/2 560 having half the frequency of the bus clock signal 505. The bus clock signal/2 560 transitions on falling edges of the bus clock signal 505. It will be appreciated that in some implementations, the circuit 700 would be designed so that the state of the D flip flop 571 would be controlled, and not be allowed to run free as in this example circuit.

Combinatorial circuitry 572 generates the spread spectrum clock signal 515 using the bus clock signal 505, the bus clock signal delayed 550 and the bus clock signal/2 560. In this example, the combinatorial circuitry includes two AND gates and an OR gate. The spread spectrum clock signal 515 is generated by combining the inversion of the bus clock signal 505, the bus clock signal delayed 550, the bus clock signal/2 560, and the inversion of the bus clock signal/2 560. The bus clock signal/2, operating at half the frequency of the bus clock signal, is used by the combinatory circuitry 572 to alternately select the bus clock signal, and on every other cycle, to select the ANDed output of the bus clock signal delayed 550 and bus clock signal 505.

Figure 6:
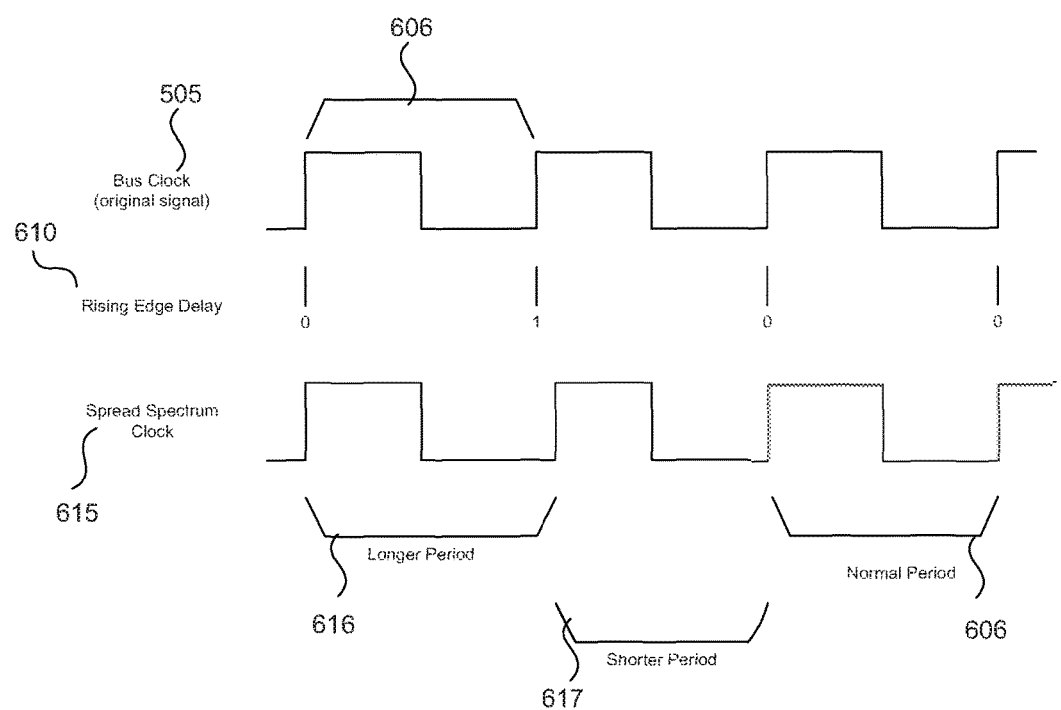
FIG. 6 shows another example digital spread spectrum technique, in accordance with some implementations.

An example of a digital spread spectrum technique where the EM emissions are split into three buckets is shown in FIG. 6. The spread spectrum bus clock 615 includes the longer period 616, the shorter period 617, and a normal period 606. This can be achieved by delaying one out of every three rising edges of the bus clock signal by one master clock signal period, as shown at 610, wherein a 1 means delaying the rising edge and a 0 means not delaying the rising edge. Those of skill in the art will appreciate that similar digital approaches can be used to achieve greater emission reduction by more complicated delay variations that cause the bus clock to modulate between more than three frequencies.

Returning to FIG. 4, the spread spectrum clock signal is sent to the one or more elements, such as the lighting boards 302, in block 415. The spread spectrum clock signal may be carried along the length 327 of the bus 325 along with the data signal 317. In some implementations, the data signal may be given the same timing treatment, such as by the programmable logic device, as the bus clock signal. This allows the data signal to be synchronized with the "jitter" of the spread spectrum clock signal to avoid possible clock and data synchronization problems at the one or more elements.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the invention.

What is claimed is:

1. A signal-processing device comprising a signal processor configured to:
   receive a bus clock signal comprising a fundamental frequency and fundamental spectral components at harmonics of the fundamental frequency, the bus clock signal based on a master clock signal, the bus clock signal comprising a divided master clock signal, wherein the fundamental spectral components each comprise a fundamental amplitude;
   generate a spread-spectrum clock signal by causing the bus clock signal to jitter between two or more frequencies around the fundamental frequency such that the spread-spectrum clock signal has a nominal frequency substantially equivalent to the fundamental frequency of the bus clock signal; and
   transmit the spread-spectrum clock signal to a lighting board via a bus,
   wherein the spread-spectrum clock signal comprises nominal spectral components at harmonics of the nominal frequency, wherein the nominal spectral components each comprise a nominal amplitude less than the fundamental amplitude of the fundamental spectral component at the same harmonic.

2. The signal-processing device of claim 1, wherein the signal processor is further configured to receive a data signal and synchronize the data signal with the spread-spectrum clock signal.

3. The signal-processing device of claim 2, wherein the signal processor is further configured to transmit the synchronized data signal to the lighting board via the bus.

4. The signal-processing device of claim 1, wherein the signal processor comprises a programmable logic device.

5. The signal-processing device of claim 4, wherein the programmable logic device comprises an integrated circuit.

6. The signal-processing device of claim 1, wherein the signal processor is configured to generate the spread-spectrum clock signal utilizing the bus clock signal and the master clock signal.

7. The signal-processing device of claim 6, wherein the amount of jitter between the two or more frequencies around the fundamental frequency is based on a frequency of the master clock signal.

8. A method of operating a signal processing device, the method comprising:
   receiving, by a signal processor, a bus clock signal comprising a fundamental frequency and fundamental spectral components at harmonics of the fundamental frequency, the bus clock signal based on a master clock signal, wherein the bus clock signal comprises a divided master clock signal, and wherein the fundamental spectral components each comprise a fundamental amplitude;
   generating, by the signal processor, a spread-spectrum clock signal by causing the bus clock signal to jitter between two or more frequencies around the fundamental frequency such that the spread-spectrum clock signal has a nominal frequency substantially equivalent to the fundamental frequency of the bus clock signal; and
   transmitting, by the signal processor, the spread-spectrum clock signal to a lighting board via a bus,
   wherein the spread-spectrum clock signal comprises nominal spectral components at harmonics of the nominal frequency, wherein the nominal spectral components each comprise a nominal amplitude less than the fundamental amplitude of the fundamental spectral component at the same harmonic.

9. The method of claim 8, further comprising receiving, by the signal processor, a data signal and synchronizing, by the signal processor, the data signal with the spread-spectrum clock signal.

10. The method of claim 9, further comprising transmitting, by the signal processor, the synchronized data signal to the lighting board via the bus.

11. The method of claim 8, wherein the signal processor comprises a programmable logic device.

12. The method of claim 11, wherein the programmable logic device comprises an integrated circuit.

13. The method of claim 8, further comprising generating, by the signal processor, the spread-spectrum clock signal utilizing the bus clock signal and the master clock signal.

14. The method of claim 8, wherein the amount of jitter between the two or more frequencies around the fundamental frequency is based on a frequency of the master clock signal.

15. A signal-processing device comprising a signal processor configured to:
   receive a bus clock signal comprising a fundamental frequency and fundamental spectral components at harmonics of the fundamental frequency, the bus clock signal based on a master clock signal, wherein the fundamental spectral components each comprise a fundamental amplitude;

generate a spread-spectrum clock signal utilizing the bus clock signal and the master clock signal by causing the bus clock signal to jitter between two or more frequencies around the fundamental frequency such that the spread-spectrum clock signal has a nominal frequency substantially equivalent to the fundamental frequency of the bus clock signal; and transmit the spread-spectrum clock signal to a lighting board via a bus, wherein the spread-spectrum clock signal comprises nominal spectral components at harmonics of the nominal frequency, wherein the nominal spectral components each comprise a nominal amplitude less than the fundamental amplitude of the fundamental spectral component at the same harmonic.

16. The signal-processing device of claim 15, wherein the amount of jitter between the two or more frequencies around the fundamental frequency is based on a frequency of the master clock signal.

* * * * *